(12) United States Patent
Pieper (10) Patent No.: US 9,307,213 B2
(45) Date of Patent: Apr. 5, 2016

(54) ROBUST SELECTION AND WEIGHTING FOR GRAY PATCH AUTOMATIC WHITE BALANCING

(71) Applicant: Nvidia Corporation, Santa Clara, CA (US)

(72) Inventor: Sean Midthun Pieper, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/668,708

(22) Filed: Nov. 5, 2012

(65) Prior Publication Data
US 2014/0125836 A1    May 8, 2014

(51) Int. Cl.
H04N 5/76 (2006.01)
H04N 9/73 (2006.01)

(52) U.S. Cl.
CPC ................................. H04N 9/735 (2013.01)

(58) Field of Classification Search
CPC ... H04N 5/235; H04N 5/2353; H04N 5/2351; H04N 5/2352; H04N 2101/00; H04N 9/045; H04N 5/232; H04N 5/772; H04N 5/335; H04N 5/23293; H04N 9/735; H04N 1/6086; H04N 9/73; H04N 2209/046
USPC .................................. 348/221.1, 222.1, 223.1
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,646,251 A | 2/1987 | Hayes et al. | |
| 4,739,495 A | 4/1988 | Levine | |
| 4,771,470 A | 9/1988 | Geiser et al. | |
| 4,920,428 A | 4/1990 | Lin et al. | |
| 4,987,496 A | 1/1991 | Greivenkamp, Jr. | |
| 5,175,430 A | 12/1992 | Enke et al. | |
| 5,261,029 A | 11/1993 | Abi-Ezzi et al. | |
| 5,305,994 A | 4/1994 | Matsui et al. | |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

J. Bolz, R Schroder; "rapid evaluation of catmull-clark subdivision surfaces"; Web 3D '02 Feb. 24, 2002.

(Continued)

*Primary Examiner* — Sinh Tran
*Assistant Examiner* — Selam Gebriel (57) ABSTRACT

Embodiments of the present invention are directed to methods and systems for robust weighting of gray patches in automatic white balancing in an image-capture device by utilizing kernel density estimation techniques with dynamically variable bandwidth to determine the probability density of samples to create an initial estimate, then verifying the initial gray point estimate to account for outliers. In one embodiment, given a set of image data, an initial gray point estimate in a color space is determined for the set of image data. The initial estimate is then refined by weighting the sub-population with the greatest probability of being gray. A final evaluation that includes a further comparison to pre-programmed constraints determines a final estimate, which can still be further tuned according to user preferences by adjusting color biases. The resulting final gray point estimate provides greater stability, and greatly improved accuracy over traditional techniques and solutions.

37 Claims, 7 Drawing Sheets

(56) References Cited

U.S. PATENT DOCUMENTS

| | | | |
|---|---|---|---|
| 5,387,983 A | 2/1995 | Sugiura et al. | |
| 5,475,430 A | 12/1995 | Hamada et al. | |
| 5,513,016 A | 4/1996 | Inoue | |
| 5,608,824 A | 3/1997 | Shimizu et al. | |
| 5,652,621 A | 7/1997 | Adams, Jr. et al. | |
| 5,793,433 A | 8/1998 | Kim et al. | |
| 5,878,174 A | 3/1999 | Stewart et al. | |
| 5,903,273 A | 5/1999 | Mochizuki et al. | |
| 5,905,530 A | 5/1999 | Yokota et al. | |
| 5,995,109 A | 11/1999 | Goel et al. | |
| 6,016,474 A | 1/2000 | Kim et al. | |
| 6,078,331 A | 6/2000 | Pulli et al. | |
| 6,111,988 A | 8/2000 | Horowitz et al. | |
| 6,118,547 A | 9/2000 | Tanioka | |
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1 | 6/2001 | Kondo | |
| 6,256,038 B1 | 7/2001 | Krishnamurthy | |
| 6,281,931 B1 | 8/2001 | Tsao et al. | |
| 6,289,103 B1 | 9/2001 | Sako et al. | |
| 6,314,493 B1 | 11/2001 | Luick | |
| 6,319,682 B1 | 11/2001 | Hochman | |
| 6,323,934 B1 | 11/2001 | Enomoto | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,486,971 B1 | 11/2002 | Kawamoto | |
| 6,584,202 B1 | 6/2003 | Montag et al. | |
| 6,683,643 B1 | 1/2004 | Takayama et al. | |
| 6,707,452 B1 | 3/2004 | Veach | |
| 6,724,423 B1 | 4/2004 | Sudo | |
| 6,724,932 B1 | 4/2004 | Ito | |
| 6,737,625 B2 | 5/2004 | Baharav et al. | |
| 6,760,080 B1 | 7/2004 | Moddel et al. | |
| 6,785,814 B1 | 8/2004 | Usami et al. | |
| 6,806,452 B2 | 10/2004 | Bos et al. | |
| 6,839,062 B2 | 1/2005 | Aronson et al. | |
| 6,856,441 B2 | 2/2005 | Zhang et al. | |
| 6,891,543 B2 | 5/2005 | Wyatt | |
| 6,900,836 B2 | 5/2005 | Hamilton, Jr. | |
| 6,950,099 B2 | 9/2005 | Stollnitz et al. | |
| 7,009,639 B1 | 3/2006 | Une et al. | |
| 7,015,909 B1 | 3/2006 | Morgan, III et al. | |
| 7,023,479 B2 | 4/2006 | Hiramatsu et al. | |
| 7,088,388 B2 | 8/2006 | MacLean et al. | |
| 7,092,018 B1 | 8/2006 | Watanabe | |
| 7,106,368 B2 | 9/2006 | Daiku et al. | |
| 7,133,041 B2 | 11/2006 | Kaufman et al. | |
| 7,133,072 B2 | 11/2006 | Harada | |
| 7,221,779 B2 | 5/2007 | Kawakami et al. | |
| 7,227,586 B2 * | 6/2007 | Finlayson et al. | 348/655 |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,486,844 B2 | 2/2009 | Chang et al. | |
| 7,502,505 B2 | 3/2009 | Malvar et al. | |
| 7,580,070 B2 | 8/2009 | Yanof et al. | |
| 7,626,612 B2 | 12/2009 | John et al. | |
| 7,627,193 B2 | 12/2009 | Alon et al. | |
| 7,671,910 B2 | 3/2010 | Lee | |
| 7,728,880 B2 * | 6/2010 | Hung et al. | 348/223.1 |
| 7,750,956 B2 | 7/2010 | Wloka | |
| 7,817,187 B2 | 10/2010 | Silsby et al. | |
| 7,859,568 B2 | 12/2010 | Shimano et al. | |
| 7,860,382 B2 | 12/2010 | Grip | |
| 8,238,695 B1 | 8/2012 | Davey et al. | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 | 11/2002 | Nguyen | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1 | 7/2003 | Kawamoto | |
| 2003/0142222 A1 * | 7/2003 | Hordley | 348/223.1 |
| 2003/0146975 A1 | 8/2003 | Joung et al. | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0218672 A1 | 11/2003 | Zhang et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0066970 A1 | 4/2004 | Matsugu | |
| 2004/0100588 A1 | 5/2004 | Hartson et al. | |
| 2004/0101313 A1 | 5/2004 | Akiyama | |
| 2004/0109069 A1 | 6/2004 | Kaplinsky et al. | |
| 2004/0189875 A1 | 9/2004 | Zhai et al. | |
| 2004/0218071 A1 | 11/2004 | Chauville et al. | |
| 2004/0247196 A1 | 12/2004 | Chanas et al. | |
| 2005/0007378 A1 | 1/2005 | Grove | |
| 2005/0007477 A1 | 1/2005 | Ahiska | |
| 2005/0030395 A1 | 2/2005 | Hattori | |
| 2005/0046704 A1 | 3/2005 | Kinoshita | |
| 2005/0099418 A1 | 5/2005 | Cabral et al. | |
| 2005/0175257 A1 | 8/2005 | Kuroki | |
| 2005/0185058 A1 | 8/2005 | Sablak | |
| 2005/0213128 A1 * | 9/2005 | Imai et al. | 358/1.9 |
| 2005/0238225 A1 | 10/2005 | Jo et al. | |
| 2005/0243181 A1 | 11/2005 | Castello et al. | |
| 2005/0248671 A1 | 11/2005 | Schweng | |
| 2005/0261849 A1 | 11/2005 | Kochi et al. | |
| 2005/0286097 A1 * | 12/2005 | Hung et al. | 358/509 |
| 2006/0050158 A1 | 3/2006 | Irie | |
| 2006/0061658 A1 | 3/2006 | Faulkner et al. | |
| 2006/0087509 A1 | 4/2006 | Ebert et al. | |
| 2006/0119710 A1 | 6/2006 | Ben-Ezra et al. | |
| 2006/0133697 A1 | 6/2006 | Uvarov et al. | |
| 2006/0176375 A1 | 8/2006 | Hwang et al. | |
| 2006/0197664 A1 | 9/2006 | Zhang et al. | |
| 2006/0274171 A1 | 12/2006 | Wang | |
| 2006/0290794 A1 | 12/2006 | Bergman et al. | |
| 2006/0293089 A1 | 12/2006 | Herberger et al. | |
| 2007/0091188 A1 | 4/2007 | Chen et al. | |
| 2007/0147706 A1 | 6/2007 | Sasaki et al. | |
| 2007/0171288 A1 | 7/2007 | Inoue et al. | |
| 2007/0236770 A1 | 10/2007 | Doherty et al. | |
| 2007/0247532 A1 | 10/2007 | Sasaki | |
| 2008/0030587 A1 | 2/2008 | Helbing | |
| 2008/0062164 A1 | 3/2008 | Bassi et al. | |
| 2008/0231726 A1 | 9/2008 | John | |
| 2009/0002517 A1 | 1/2009 | Yokomitsu et al. | |
| 2009/0010539 A1 | 1/2009 | Guarnera et al. | |
| 2009/0116750 A1 | 5/2009 | Lee et al. | |
| 2009/0160957 A1 | 6/2009 | Deng et al. | |
| 2009/0257677 A1 | 10/2009 | Cabral et al. | |
| 2010/0266201 A1 | 10/2010 | Cabral et al. | |
| 2011/0096190 A1 * | 4/2011 | Silverstein et al. | 348/223.1 |

(56) References Cited

U.S. PATENT DOCUMENTS

| | | | |
|---|---|---|---|
| 2013/0083216 A1* | 4/2013 | Jiang et al. | 348/223.1 |
| 2015/0002692 A1 | 1/2015 | Cabral et al. | |
| 2015/0002693 A1 | 1/2015 | Cabral et al. | |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

J. Stam; "Exact Evaluation of Catmull-clark subdivision surfaces at arbitrary parameter values"; Jul. 1998; Computer Graphics; vol. 32; pp. 395-404.

Keith R. Slavin; Application As Filed entitled "Efficient Method For Reducing Noise And Blur In A Composite Still Image From A Rolling Shutter Camera"; U.S. Appl. No. 12/069,669, filed Feb. 11, 2008.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at Chapel Hill, Technical Report, pp. 1-36.

Kuno et al. "New Interpolation Method Using Discriminated Color Correlation for Digital Still Cameras" IEEE Transac. On Consumer Electronics, vol. 45, No. 1, Feb. 1999, pp. 259-267.

Loop, C., DeRose, T., Generalized B-Spline surfaces o arbitrary topology, Aug. 1990, SIGRAPH 90, pp. 347-356.

M. Halstead, M. Kass, T. DeRose; "efficient, fair interolation using catmull-clark surfaces"; Sep. 1993; Computer Graphics and Interactive Techniques, Proc; pp. 35-44.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www.ideallibrary.com, Real-Time Imaging 8, pp. 317-328, 2002.

T. DeRose, M., Kass, T. Troung; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-basd mesh simplificatio and reconstruction of aproximated B-Spline surfaces, 200, Eighth Pacific Conference on computer graphics and applications pp. 202-2012.

Uomori et al., "Automatic Image Stabilizing System by Full-Digital Signal Processing", vol. 36, No. 3, pp. 510-519, Aug. 1990.

Uomori et al., "Electronic Image Stabiliztion System for Video Cameras and VCRS", J. Soc. Motion Pict. Telev. Eng., vol. 101, pp. 66-75, 1992.

"A Pipelined Architecture for Real-Time orrection of Barrel Distortion in Wide-Angle Camera Images", Hau, T. Ngo, Student Member, IEEE and Vijayan K. Asari, Senior Member, IEEE Transaction on Circuits and Sytstems for Video Technology: vol. 15 No. 3 Mar. 2005 pp. 436-444.

"Calibration and removal of lateral chromatic abberation in images" Mallon, et al. Science Direct Copyright 2006; 11 pages.

"Method of Color Interpolation in a Singe Sensor Color Camera Using Green Channel Seperation"Weerasighe, et al Visual Information Processing Lab, Motorola Austrailian Research Center pp. IV-3233-IV3236, 2002.

D. Doo, M. Sabin "Behaviour of recrusive division surfaces near extraordinary points"; Sep. 197; Computer Aided Design; vol. 10, pp. 356-360.

D.W.H. Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACM SIGGRAPH Jul. 2005, pp. 453-463.

E. Catmull, J. Clark, "recursively enerated B-Spline surfaces on arbitrary topological meshes"; Nov. 1978; Computer aided design; vol. 10; pp. 350-355.

gDEBugger, graphicRemedy, http://www.gremedy.com, Aug. 8, 2006, pp. 1-18.

http://en.wikipedia.org/wiki/Bayer_filter; "Bayer Filter"; Wikipedia, the free encyclopedia; pp. 1-4.

http://en.wikipedia.org/wiki/Color_filter_array; "Color Filter Array"; Wikipedia, the free encyclopedia; pp. 1-5.

http://en.wikipedia.org/wiki/Color_space; "Color Space"; Wikipedia, the free encyclopedia; pp. 1-4.

http://en.wikipedia.org/wiki/Color_translation; "Color Management"; Wikipedia, the free encyclopedia; pp. 1-4.

http://en.wikipedia.org/wiki/Demosaicing; "Demosaicing"; Wikipedia, the free encyclopedia; pp. 1-5.

http://en.wikipedia.org/wiki/Half_tone; "Halftone"; Wikipedia, the free encyclopedia; pp. 1-5.

http://en.wikipedia.org/wiki/L*a*b; "Lab Color Space"; Wikipedia, the free encyclopedia; pp. 1-4.

http://Slashdot.org/articles/07/09/06/1431217.html.

http:englishrussia.com/?p=1377.

* cited by examiner

301 Calculate Probability Density

303 Plot Probability Density Function

305 Identify First Peak in Plot of Probability Density Function

307 Determine First Sample Population from First Peak

ROBUST SELECTION AND WEIGHTING FOR GRAY PATCH AUTOMATIC WHITE BALANCING

BACKGROUND

When an imaging device such as a camera takes pictures under one or more sources of light, the image off the sensor will have a color bias depending on the color temperature of the specific source(s) of light. For example, in scenes with a light generated from a tungsten source, un-modified pictures may have an overall yellowish-orange cast. Under natural lighting during twilight however, images will often have a very bluish cast. In order to mitigate the potentially heavy color biasing that occurs under varying light conditions, adjustments are typically performed either internally within the device or during the processing phase to balance the sensor response so that the resulting images appear relatively normalized to the human eye. This process is referred to as white balancing.

According to contemporary photographic techniques, each pixel in a scene or image can be represented as a vector with one dimension for each of a multitude of color channels. For example, in a three color image, each pixel can be represented as a three dimensional vector (e.g., typically the vector [R,G, B]). This vector can be projected down to a lower dimensional space, such as by transforming it to a two-dimensional luminance/chrominance color space (viz, the YUV color space). A YUV pixel can be represented by just its color terms as a two dimensional vector [u,v] for a given luminance (y). The YUV space assumes that white balance has already been performed, so for colorimetry, a space called xy (based on the response of the human eye) or the related little-r, little-b space (based on a particular sensor) are commonly used instead. All these space share the property that light intensity is factored out and only color is considered. Points in such a space are thus called chromaticity coordinates. In the xy space, colors of natural illuminants will have a distribution that falls along a smooth curve called the Planckian locus. The human visual system has evolved to recognize a wide range of natural lights as color neutral, but will perceive lights with a significantly different chromaticity as colorful. Artificial lights are, therefore, generally designed to produce a chromaticity that lies near the Planckian locus.

There exist several approaches to automatic white balancing. In several conventional approaches, characteristics of an image (e.g., the coordinates of the pixels comprising the image) are used to estimate the color of the illumination. This estimated illumination, represented as a value, is subsequently factored out of the pixel colors. A popular method is known as the "Gray World" approach. According to the Gray World method, the color values corresponding to pixels of an image are averaged and the average color of the image is used as the estimated color of the illuminant (and thus, removed). Factors of scale on each color channel are chosen so that the average color, after scaling is performed, results in a neutral (gray) color value.

Unfortunately, one of the major failings of standard gray world is that it typically will have very poor performance in scenes with a dominant color, or large colored surfaces, such as a close-up of a human face, or an image dominated by large portions of blue sky. For these scenes, the gray world technique will over bias the illuminant color (e.g., as human skin, or blue). After the illumination is factored out, the resulting skin or sky can appear overly gray (neutral), with all other objects having an unintended (and inaccurate) hue. The default gray world approach also has the problem that there is nothing preventing it from causing actual gray objects in scenes to be rendered inaccurately green or magenta as a result of applying the bias from the overall scene, and it is even possible in certain cases where gray world performs worse than a fixed white balance.

Furthermore, the estimated illuminant color derived from the average of the pixel values can be sub-optimal for the purposes of normalization. In certain circumstances, the estimated illuminant color can be a highly unlikely color for an illuminant and factoring the illuminant color out of the image will result in images with distorted coloring. For example, in scenes with mostly green foliage, the average color value will be a value that approximates some shade of green. According to the Gray World model, the illuminant will be estimated as a green light and will be subsequently factored out of the image, thus resulting in foliage that appears neutral, i.e., gray, and adversely affecting the appearance of the image.

There are a number of conventional alternatives to the Gray World technique, and the technique itself is often considered a poor method of white balancing in academic literature. However, Gray World remains a popular theory for white balancing implementations in practice due to its robustness to sensor variation, simplicity of implementation, computational speed, and general stability. Previous attempts to improve Gray world performance include constraining the Gray World estimate so that it corresponds to a light, a "difference Gray world" that uses only edge samples to reduce the impact of solid colored objects, and various methods that modify the contribution of a sample to the white balance estimates as a function of sample brightness. However, each of these attempts, while providing advantages over the basic Gray World solution, unfortunately still suffer from some flaws. Constraining the estimate still fails to address the fundamental problems of Gray World, and merely reduces the worst-case error. Difference Gray World helps reduce the impact of large solid colors, but reduces the number of viable samples which will increase sensitivity to scene change and also tends to have a bias towards highly textured surfaces. Methods that weight bright samples more heavily have severe problems in indoor scenes where the outdoors is visible, as sunlight tends to be much brighter than interior lighting.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the present invention are directed to methods and systems for robust detection of gray patches in automatic white balancing, e.g., in an image-capture device. According to an embodiment, the process of automatic white balancing begins at the reception of a set of image data. This data can include, for example, compressed data values in an RGB color space according to a Bayer pattern on the sensor with red, green, and blue filters. In still further embodiments, the data values may correspond to sensor color spaces with alternate and/or additional filters. This data may be somewhat processed to compensate for known or estimated properties of the optical system and sensor response (e.g. vignetting, color non-uniformity, and haze). During an initial step of the process, the received data values may be prepared for processing. That is, the data values may be decompressed to derive various intermediate data for each sample (e.g., pixel in the image) with the results being stored in a large working buffer, for example. Once prepared, analysis is performed on the samples to find a candidate set of pixels or pixel regions with a estimated reasonable chance of being the gray point by culling unlikely samples determined by a cost function as applied to the distance.

An initial gray point in the image is subsequently estimated by averaging all members of the candidate set. The initial estimate and candidate set are then fed into a refinement stage which compensates for outliers among the candidate set. The result of the refinement process is then evaluated to determine if the estimate is consistent with what can be expected given the data (e.g., a reasonable estimate), and, depending on that determination, the estimate may be accepted, or, alternatively may be combined with or replaced by a previously determined acceptable result. The output from this stage is the refined gray point.

Alternately, in lieu of a simple accept/reject evaluation, the estimate can be supplemented with a confidence value which can then be used to smoothly vary the contribution of the estimate to actual system state. According to further embodiments, the refined gray point may also be manipulated to compensate for tuning purposes (e.g., color preference, CCT bias, and isothermic bias) and to further bound the set of gray points allowed (thickness). This produces the final gray point. Finally, the final gray point is then converted into a set of whitebalance gains that are supplied to the hardware and a color temperature that can be used to control multi-lens shading.

According to another aspect, a system configured to perform automatic white balancing with robust weighting of gray patches is provided. In one embodiment, the process for automatically balancing light of a captured scene is performed in, for example, the processing unit of an exemplary image-capture device. In further embodiments, the process is supplemented with greater specificity by dynamically adjusting a threshold for color preference and/or tuning depending on the results of the estimator.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Color Space

Throughout the following detailed description, references are made to images and image data. Typically, this image data corresponds to a two-dimensional image of a scene, captured in an image capture device, and comprising a plurality of individual units (called pixels) arranged in a two-dimensional array. According to embodiments, this image data may include values for the individual pixels. These values may further be expressed as digitized color values among a plurality of color channels (e.g., red, green, and blue) in a three dimensional color space, such as an RGB color space. According to alternate embodiments, the color space can may be expressed as a function of a two-dimensional color space, such as an r/g, b/g color space. According to such embodiments, the color space may comprise a harmonic mean color space with luminance and chrominance components defined as:

$$u = \frac{3}{\frac{r}{r} + \frac{r}{g} + \frac{r}{b}}, v = \frac{3}{\frac{b}{r} + \frac{b}{g} + \frac{b}{b}}.$$

As such, the u and v components may correspond to the harmonic mean of relative redness and relative blueness. According to some embodiments, common or "known" light sources (both Planckian and fluorescent) fall along a straight line, referred to herein as the gray line, when plotted in the color space. Within such a space, the upper left region of the space corresponds to warm colors (e.g., red, orange), the lower right region of the space corresponds to cool colors (e.g., blue), with the lower left region corresponding to purple and the upper right region corresponding to green. The gray line runs from warm to cool, with the exact positioning varying, depending on the particular sensor of the image capture device.

Since the color space is based on a harmonic mean, direct conversion of a u, v coordinate to a set of white balance gains can be performed. The conversion may be expressed as:

$$rgain = \frac{u}{3}, bgain = \frac{v}{3}, ggain = (1 - rgain - bgain).$$

The above expression may be used to convert color data into gains wherever application of a set of white balance gains to image data for automatic white balancing is herein discussed.

Exemplary Operating Environment

Figure 1:
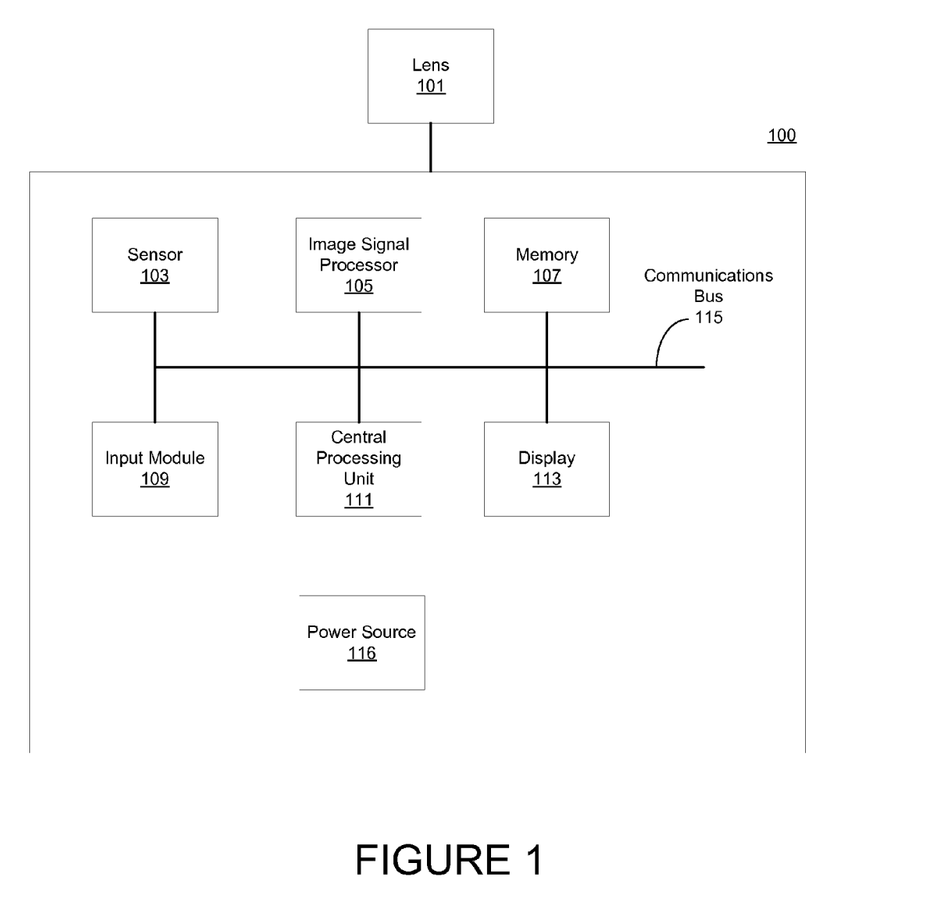
FIG. 1 depicts an exemplary operating environment in which various embodiments of the present invention may be performed, in accordance with various embodiments of the present invention.

Embodiments of the claimed subject matter are directed to methods and systems for estimating a gray point for use in automatic white balancing in an image recorded from an image-capture device. FIG. 1 shows an exemplary operating environment in accordance with one embodiment of the present invention. Digital system 100 depicts the components of a basic system in accordance with embodiments of the present invention providing the execution platform for certain hardware-based and software-based functionality. Although specific components are disclosed in system 100 it should be appreciated that such components are examples. That is, embodiments of the present invention are well suited to having various other components or variations of the components recited in system 100. It is appreciated that the components in system 100 may operate with other components other than those presented, and that not all of the components of system 100 may be required to achieve the goals of system 100.

In a typical embodiment, System 100 includes sensor 103, image signal processor (ISP) 105, memory 107, input module 109, central processing unit (CPU) 111, display 113, communications bus 115, and power source 116. Power source 116 supplies power to system 100 and may, for example, be a DC or AC power source. CPU 111 and the ISP 105 can also be integrated into a single integrated circuit die and CPU 111 and ISP 105 may share various resources, such as instruction logic, buffers, functional units and so on, or separate resources may be provided for image processing and general-purpose operations. System 100 can be implemented as, for example, a digital camera, cell phone camera, portable device (e.g., audio device, entertainment device, handheld device), webcam, video device (e.g., camcorder) and the like.

Sensor 103 receives light via a lens 101 and converts the light received into a signal (e.g., digital or analog). According to some embodiments, lens 101 may be permanently attached to the system 100. Alternatively, lens 101 may be detachable and interchangeable with lens of other properties. These properties may include, for example, focal lengths, apertures and classifications. In typical embodiments, lens 101 may be constructed of glass, though alternate materials such as quartz or molded plastics may also be used. Sensor 103 may be any of a variety of optical sensors including, but not limited to, complementary metal-oxide-semiconductor (CMOS) or charge-coupled device (CCD) sensors. Sensor 103 is coupled to communications bus 115 and may provide image data received over communications bus 115. In further embodiments, sensor 103 includes light intensity sensing capability, and the image data received may include data corresponding to the determined intensity of the light in a scene or image.

Image signal processor (ISP) 105 is coupled to communications bus 115 and processes the data generated by sensor 103. More specifically, image signal processor 105 processes data from sensor 102 for storing in memory 107. For example, image signal processor 105 may compress and determine a file format for an image to be stored in within memory 107.

The input module 109 allows the entry of user-input into system 100 which may then, among other things, control the sampling of data by sensor 103 and subsequent processing by ISP 105. Input module 109 may include, but is not limited to, navigation pads, keyboards (e.g., QWERTY), buttons, touch screen controls (e.g., via display 113) and the like.

The central processing unit (CPU) 111 receives commands via input module 109 and may control a variety of operations including, but not limited to, sampling and configuration of sensor 103, processing by ISP 105, and management (e.g., the addition, transfer, and removal) of images and/or video from memory 107.

Gray Point Estimation

Figure 2:
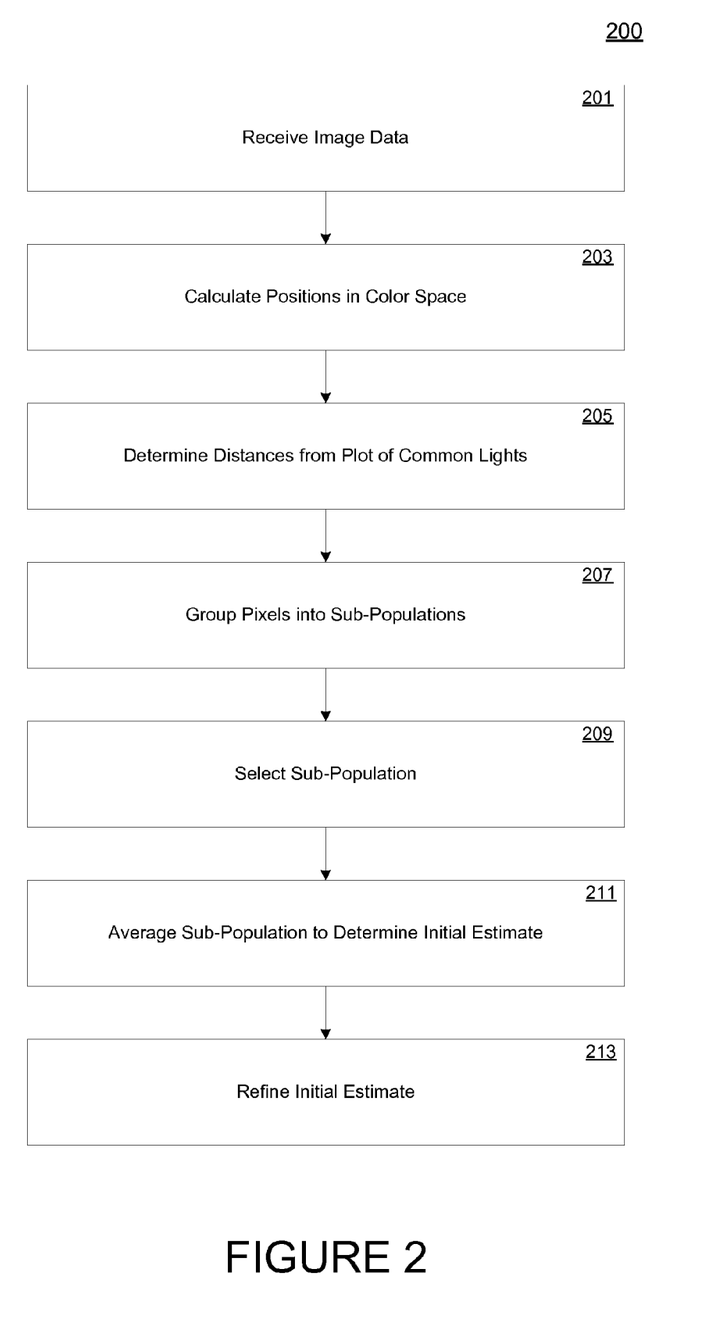
FIG. 2 depicts a flowchart of an exemplary computer implemented process for generating a gray point estimate for automatic white balance in an image captured by an image capture device, in accordance with various embodiments of the present invention.

FIG. 2 depicts a flowchart 200 of an exemplary computer implemented process for generating a gray point estimate for automatic white balance in an image captured by an image capture device, in accordance with various embodiments of the present invention. In one embodiment, the process is performed in an image-capture device. In alternate embodiments, the process may be performed by, for example, an image production and/or replication device. Steps 201-213 describe exemplary steps of the flowchart 200 in accordance with the various embodiments herein described.

As depicted in flowchart 200, image data corresponding to a captured image or recorded scene is received at step 201. In some embodiments, image data is received in a central processing unit or other microprocessor of an image-capture device from a communicatively coupled optical sensor of the image-capture device, via a data communication bus, for instance (e.g., bus 115 of FIG. 1). In further embodiments, the image data of an image is received and processed (e.g., steps 201-213 of flowchart 200 are performed) proximately after the image is captured within the same image-capture device. In still further embodiments, the pre-captured image data may be transferred from an external source (e.g., an image-capture device) to a computing device with image processing capability where the process of flowchart 200 is then performed. According to some embodiments, the image data may be stored in a computer readable memory device.

According to embodiments of the instant invention, the image data received in step 201 may comprise a down-sampled (e.g., compressed) version of an image taken by an image capture device. The down-sampled image may consist of an image in a packed format consisting of 8 bits each for red, green, and blue (or other/more colors/filters), and another 8 bits for the fraction of pixels in the sample that were saturated. According to some embodiments, the image-capture device may include a continuous capture system such as an electronic viewfinder—a display that shows the view from the sensor while live and in use (e.g., in real time). Under such embodiments, images may be continuously rendered and displayed in the viewfinder while the sensor is in use. At step 203, the image data is unpacked to access and manipulate the color values. According to further embodiments, the color values (e.g., red, green, and blue values) may be subsequently adjusted to compensate for the compression performed during down-sampling. The u and v coordinates of each sample (e.g., pixel) are then computed and stored.

At step 205, the distance from the gray line (i.e., the plot of common light sources) is determined for each sample point. According to an embodiment, for each image capture device, a gray line is fit during calibration, and the results of that process are stored in a configuration file and loaded into memory at the start of operation of the image capture device. The gray line is defined by a slope and an offset and also minimum and maximum values for u to further assist automatic white balancing with some prior knowledge about how yellow or blue a light can be. According to some embodiments, the minimum and maximum values for the line may be somewhere around 1800 Kelvin (e.g., the color temperature of flame) and 8000K (mild shade). According to further embodiments, an upper limit for deep shade may be between 10,000K and 12,000K.

According to an embodiment, the input points may be mapped to a space where the gray line runs parallel to the x-axis, and a minimum color temperature supported by the system is at the coordinate 0, 0. To efficiently determine distance in such a coordinate space, metrics such as Manhattan or L1 distance to the gray line may be used. Finally, a cost function is applied to the samples in advance of sample selection performed at step 207. The cost function generates a very large result if any of the color channels in a sample has a value that lies outside certain bounds, or if more than a small fraction of the pixels in the sample were clipped during down-sampling. Samples such as these may represent extremely unreliable and/or undesirable samples, and may be tracked with a counter to see if there are sufficient valid samples to even attempt a white balance.

According to still further embodiments, the distance to the gray line is the starting point for the cost for samples that survive the first check. However, because many of the samples have fairly limited precision (due to down sampling), an additional value may be introduced to reflect the relative error or uncertainty in the measurement of that distance. This uncertainty can be estimated as the ratio of the average rounding error determined during down-sampling to the intensity of the brightest color channel of a particular sample.

At step 207, the samples are grouped into sub-populations based on each sample's respective distance to the gray line. The basic approach at step 207 is to identify samples that could possibly be gray and take their average. Given an assumption that gray objects under a given light will tend to cluster tightly near the gray line, the samples are organized based on the distance to the gray line, and the samples in the first sub-population (e.g., the sub-population determined to be the closest to the gray line) are selected at step 209. Dividing the samples into discrete sub-populations is described in greater detail below with respect to FIG. 3. Identifying the extent of the first sample sub-population from the full sample set is described in greater detail below with respect to FIG. 4. Once the sub-population nearest to the gray line is selected at step 209, the samples in the sub-population are combined and then averaged at step 211 to determine an initial estimate of the gray point. This initial estimate point is further refined at step 213 to derive a refined gray point estimate, described in greater detail below with respect to FIG. 7.

Once a refined gray point estimate has been calculated, the estimate may be converted into a set of white balance gains. These gains may be applied as biases to the image data to account for computed lighting in the scene. Conversion may be performed across three or more color channels (e.g., the RGB color channels) as described above. In still further embodiments, the refined gray point estimate may be converted into a correlated color temperature (CCT). This temperature may be further applied in an image capture device or image processing device during multi-lens shading control. The white balance gains may also be used to perform automatic white balancing for the image rendered and displayed in viewfinders. Under such embodiments, the white balance gain is applied similarly in real time to the input data. By utilizing the described features in the present invention, these gains can be calculated with improvements in both computational efficiency (e.g., capable of maintaining 30 or more frames per second, for example) and consistency (e.g., the end user does not experience flickering or sharp changes in rendered color over traditional methods.

Sample Selection

Figure 3:
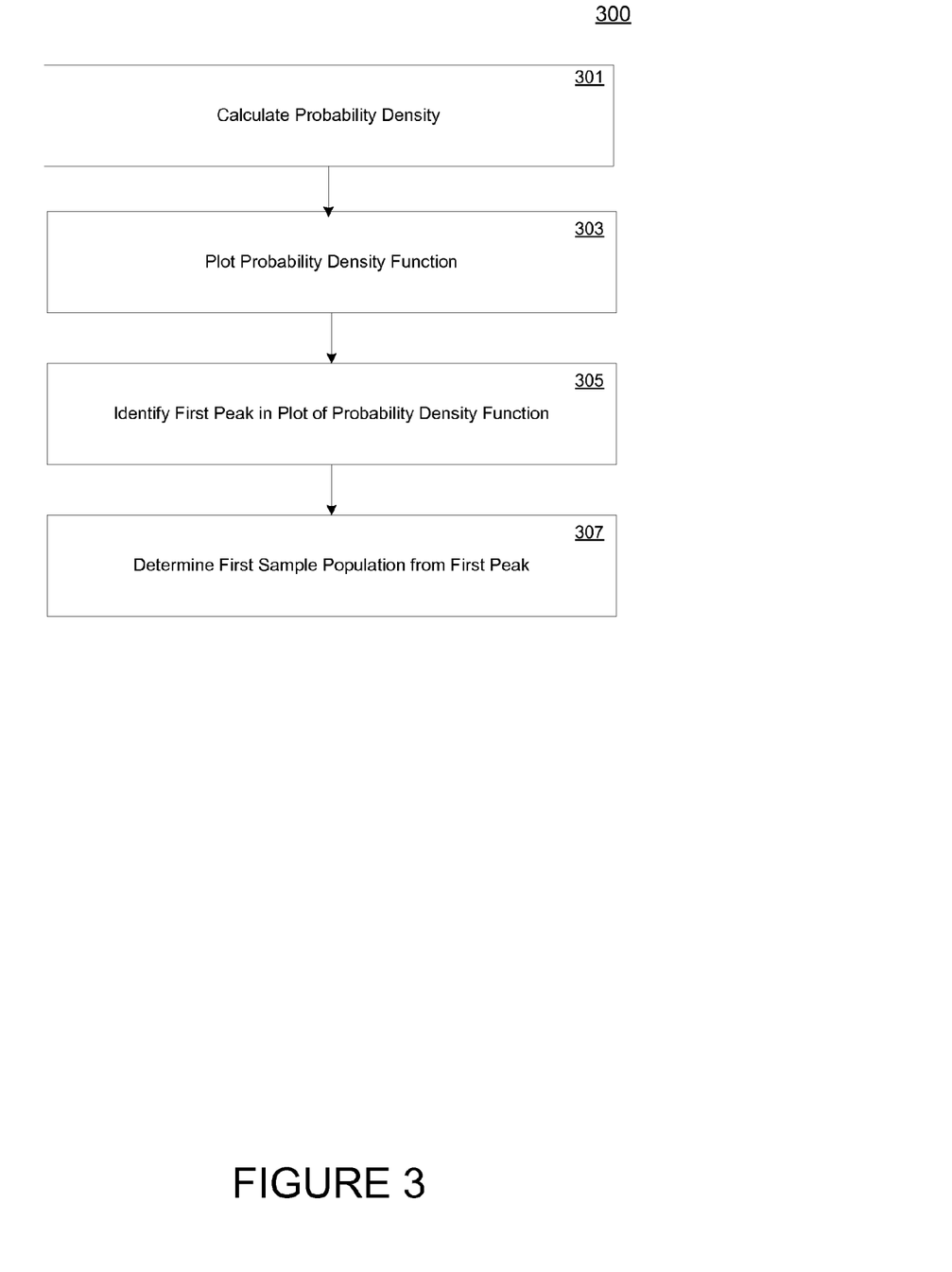
FIG. 3 depicts a flowchart of an computer implemented process for identifying samples in a process of generating a gray point estimate, in accordance with various embodiments of the present invention.

FIG. 3 depicts a flowchart 300 of a computer implemented sub-process for identifying samples in a process of generating a gray point estimate. Steps 301-305 describe exemplary steps of the process depicted in flowchart 300. According to some embodiments, steps 301-305 may be performed during step 207 described above with respect to FIG. 1, and likewise, may be performed by a processor in an image capture device, or in a computing system.

At step 301, According to various embodiments, a probability density as a function of color is estimated for the plurality of samples in the image. According to an embodiment, the probability density function may be calculated by applying a kernel density estimation (KDE) technique.

KDE has a few components: a low pass filter (called the kernel) which is specified by some sort of symmetric shape (e.g., triangle, box), and a bandwidth parameter (normally called h). The area under the kernel is always equal to 1. For any point x, the probability density can be estimated by centering the kernel around that point, evaluating the kernel for all sample points, and taking the average. Kernel shapes are typically symmetric with a peak in the center. If a high fraction of samples t lie near position x (and thus, near the peak of the kernel) this technique will estimate a high probability that a sample could be observed at that position, even if no observed sample actually falls at position x. The kernel density estimator thus estimates a continuous distribution from a discrete set of samples. As samples get further from x, the samples will decreasingly contribute to the density estimate at x. The bandwidth affects the probability distribution. For example, a box filter with bandwidth of an infinite width will estimate a flat distribution, while one with a zero width will estimate infinitely tall spikes at every sample and zero density everywhere else. The bandwidth may be estimated using a number of methods, according to various embodiments.

According to one embodiment, the bandwidth can be fixed, either using a pre-determined number, or a value calculated per frame. A per frame value could, for example, be calculated as a function of the standard deviation of the samples using the so-called rule of thumb method. According to alternate embodiments, the bandwidth can vary as a function of x. A variable width method may include, for example, a k nearest neighbors (KNN) approach, where the k samples nearest to position x are used in the density estimate and control the bandwidth of the kernel. In further embodiments, the probability density may be calculated by sorting the input samples according to distance to the gray line in ascending order, then applying a KDE technique to the sorted samples. In further embodiments, to improve (i.e., reduce) the calculation speed of the KDE, the samples can be sorted using a radix sort, then applying a kernel with a finite extent and using a rolling window. This greatly reduces the number of calculations required.

The estimated density derived by applying the KDE is then plotted at step 303. At step 305, the first peak of the plot of the estimated density is identified. The end of the first peak may, according to various embodiments, be located by traversing the plot of the PDF until a descent is determined and then continuing along the plot of the PDF until an ascent is determined. To handle some noise in the system, further embodiments may require that the inflection point be less than 90% of the peak value, so as to compensate for slight ripples in the distribution. The x coordinate of the inflection point is used as a threshold—all samples with lesser or equal distance (e.g., to the left of the inflection point) are selected as the first sample population at step 307. The constituents of the first sample population are combined and averaged to determine the initial gray point estimate in step 211 discussed above. According to still further embodiments, if the first peak contains only a few samples (e.g., below a threshold), the process may determine that there is an insufficient number of gray colored pixels in the image to calculate a good estimate and may instead opt to use the last known derived estimated gray balance data at this point.

Figure 4:
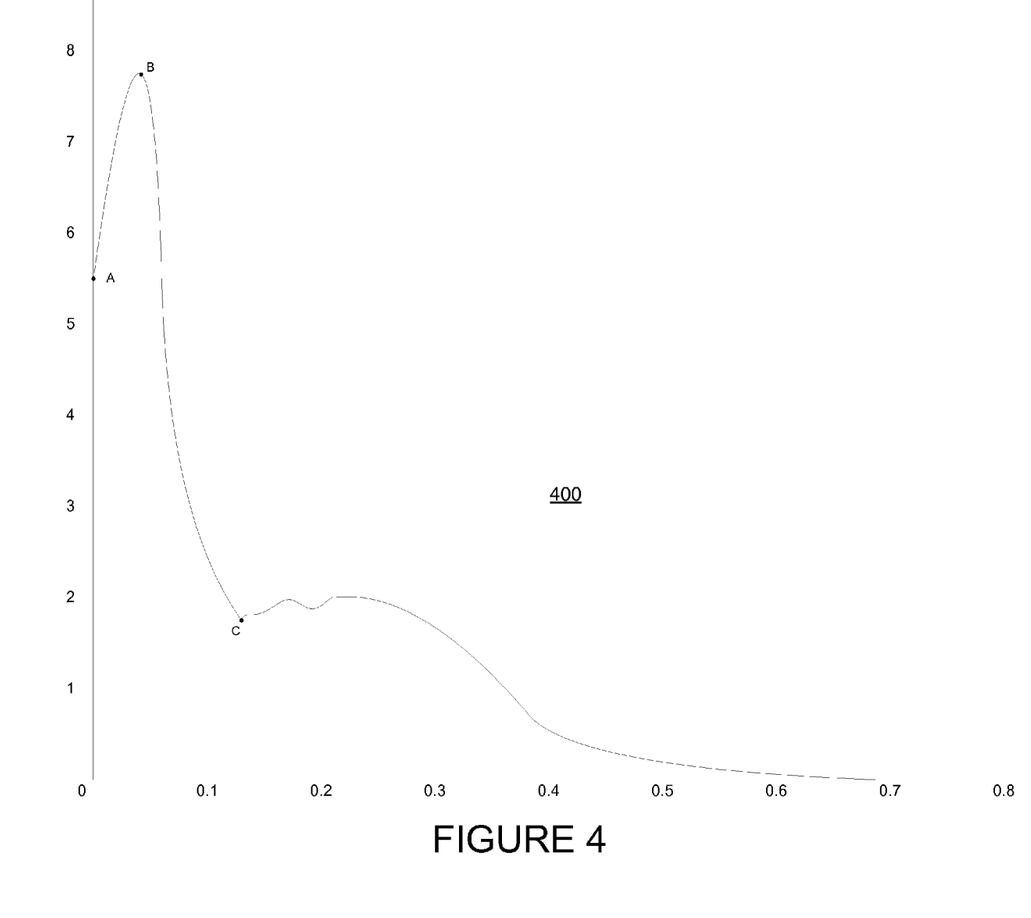
FIG. 4 depicts an exemplary plot of sample points as a function of distance under a probability density function, in accordance with various embodiments of the present invention.

FIG. 4 depicts an exemplary plot 400 of estimated density according to distance, and represents the distribution of samples in an image according to their respective distances to the gray line. The y-axis of plot 400 represents the number (technically, the density) of samples at a given distance (x-axis) from the gray line. As depicted in FIG. 4, the first peak of the plot 400 may be identified by traversing the plot 400 from point A until a descent is determined (e.g., at point B). Once a descent is identified, traversal of the plot is resumed until a subsequent ascent is determined (e.g., at point C), the point at which is referred to as the inflection point. As described above, once the inflection point has been identified, samples along the curve with lesser or equal distance from the gray line than then inflection point are grouped together as the first sample population to be used in determining both the initial gray point estimate, and during the refinement process described below.

Refinement

Figure 5:
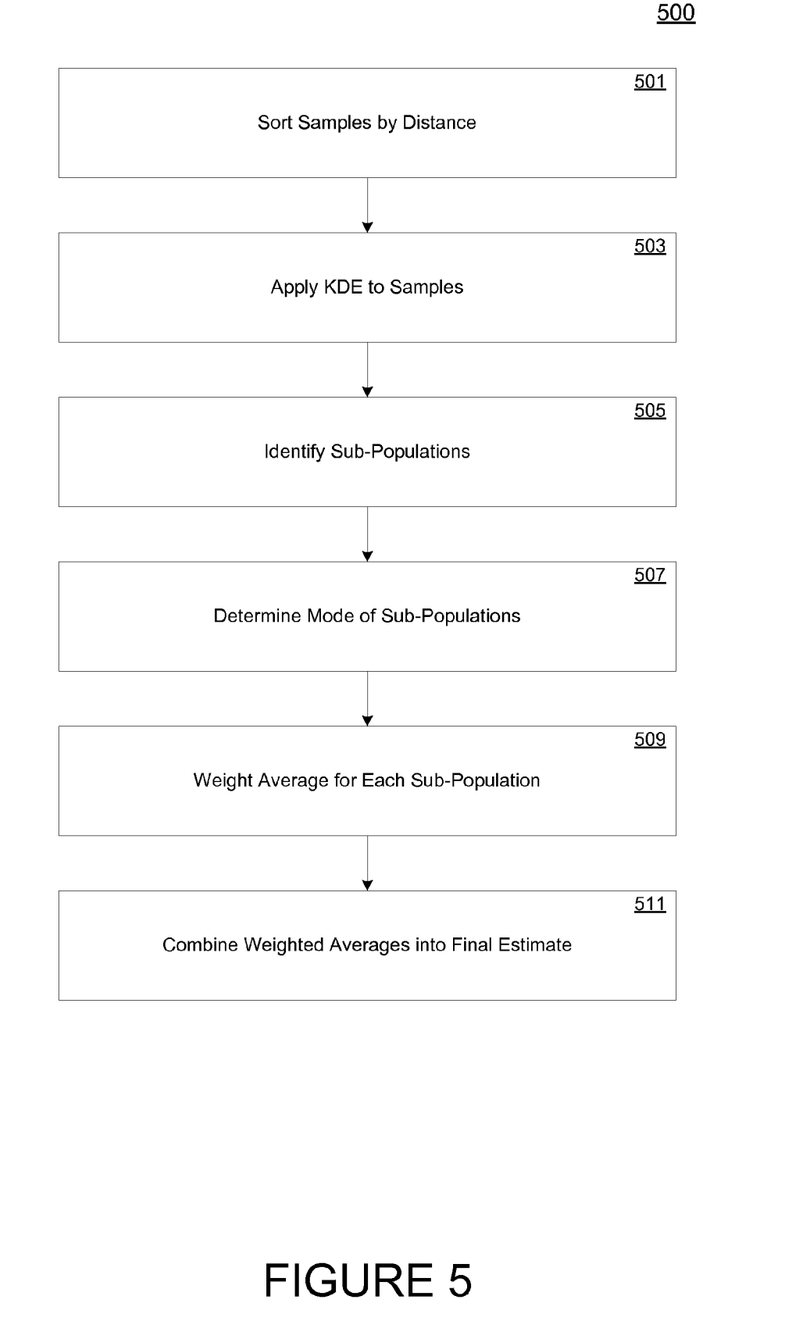
FIG. 5 depicts an flowchart of an computer implemented process for refining an initial gray point estimate in a process of generating a gray point estimate, in accordance with various embodiments of the present invention.

Generally, the plot of common lights can be quite large, and as a result is it not uncommon for a single scene to contain both gray pixels and pixels that are some other color but that cannot be distinguished from gray pixels under a different light—effectively, a form of aliasing. For example, skin tone under some fluorescents is similar in color to halogen lighting. The initial set of pixels selected based on their respective proximity to common lights may contain both gray and colorful pixels. These colorful pixels can influence the average undesirably. In the case where gray pixels are more common than colorful pixels, the average color will be closer to the gray pixels than the colorful ones. Under these circumstances, refining the initial gray point estimate can be performed to achieve more accurate white balance results in the presence of some aliasing. FIG. 5 depicts a flowchart 500 of a computer implemented sub-process for refining an initial gray point estimate in a process of generating a gray point estimate. Steps 501-511 describe exemplary steps of the process depicted in flowchart 500. According to some embodiments, steps 501-511 may be performed during step 213 described above with respect to FIG. 2, and likewise, may be performed by a processor in an image capture device, or in a computing system. The refinement stage uses the initial gray point to achieve greater precision. The goal of the refinement stage is to take the initial gray point estimate, compare the points in the candidate set (e.g., the first sample population) against that estimate, and use that information to calculate a new estimate that minimizes the impact of any outliers.

FIG. 5 begins at step 501 by sorting the candidate set (e.g., first sample population) by distance from the initial gray estimate. According to embodiments, the distance may be represented by a signed distance, where the sign is determined by the difference in the u coordinate of the YUV color space. Kernel density estimation is then applied to the sample population at step 503. Each of the peaks in the resulting distribution represents a sub-population of samples with similar color, and is identified as an individual sub-population at step 505. At step 507, the mode (peak density) of each population is calculated and used as a stable estimate of the general distance of the sub-population to the initial estimate. As each sub-population is identified, its gray point is determined (e.g., averaged) and weighted at step 509 according to the distance from the mode to the initial gray point and the number of samples in the sub-population. According to an embodiment, the distance from the mode to the initial gray point may be calculated by applying an exponential decay function as a cost function to the distance, wherein a constant change in distance to the gray line results in a constant ratio of weights. According to further embodiments, all samples in each sub-population are weighted equally in order to avoid introducing skew. The weighted estimates are then combined at step 511 and averaged into a single global estimate that will be biased towards the sub-populations that are largest and closest to the initial estimate, thereby reducing the impact of any outliers in the sample population.

Figure 6:
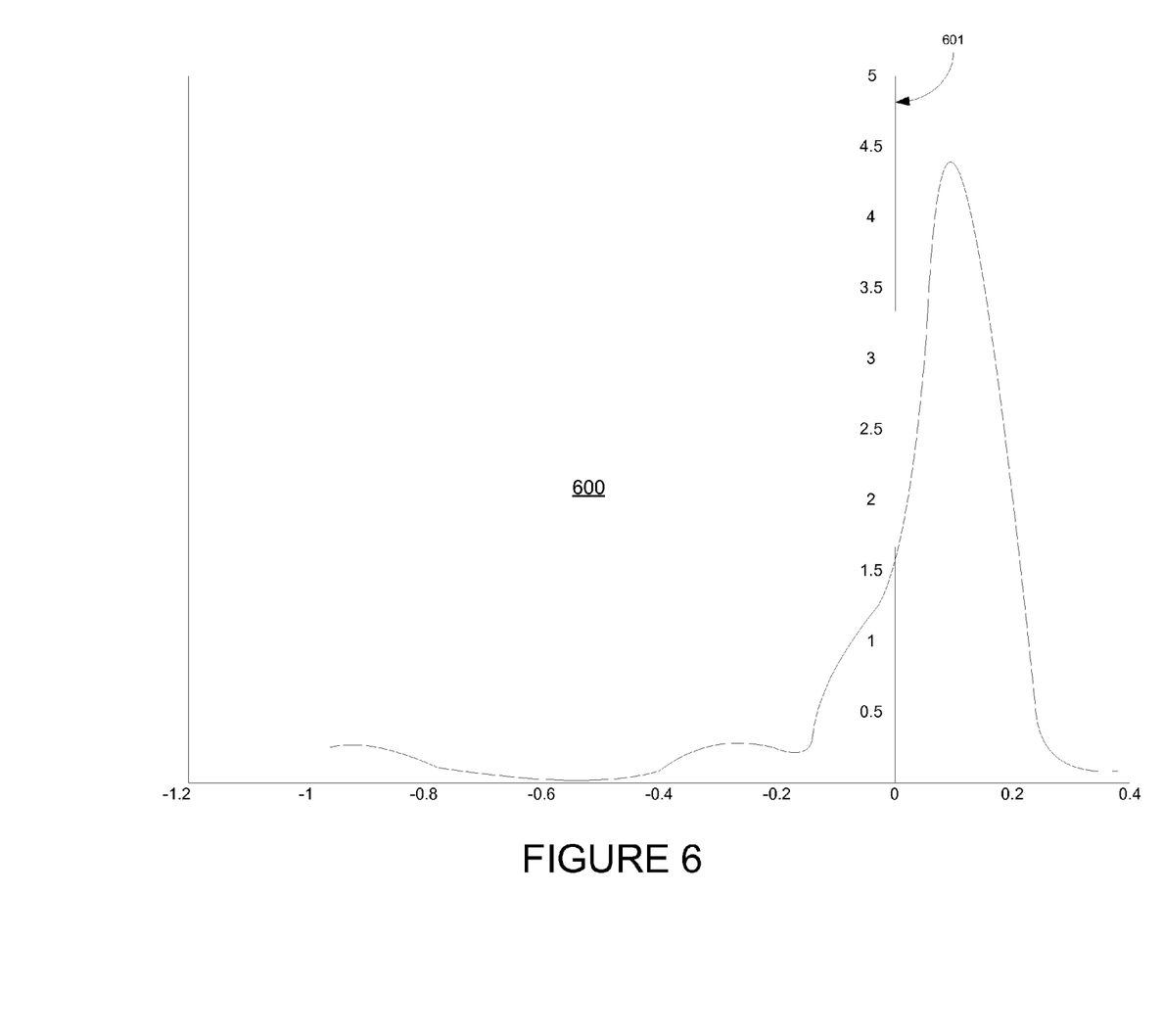
FIG. 6 depicts an exemplary plot of a kernel density estimation of the distribution of sub-populations sorted by signed distance, in accordance with various embodiments of the present invention.

FIG. 6 depicts an exemplary plot 600 of a kernel density estimation of the distribution of sub-populations sorted by signed distance, in accordance with various embodiments of the present invention. The y-axis of plot 600 represents the number of samples at a given difference from the u-coordinate (x-axis) from the initial gray estimate. As described above, refinement of the initial gray point estimate may be performed by sorting the samples in the sample population according to sub-populations corresponding to peaks in the plot 600. The averages of each sub-populations are weighted according to the distance from the mode of the respective sub-population to the initial gay point—represented as the vertical bar 601 at y=0, before being combined and averaged to determine a final gray point estimate.

According to some embodiments, the final gray point estimate may be constrained to have a color that corresponds to some feasible light. This light may be comprised in a set of feasible lights, which, If the estimate does not lie in this set, the nearest point in the set is chosen instead. If the set of feasible lights lies within a fixed distance of the gray line, this can be done by limiting the displacement of the estimate perpendicular and parallel to the line to some maximum value. The degree of correction required can also be used to reduce confidence in the estimate.

Bad Estimate Handling

After the impact of any outliers has been reduced, the estimate may still not correspond to any feasible light, and can still produce inaccurate and/or undesirable imputed lighting. This could occur, for instance, if the scene contains only a single strong color (e.g., a solid colored wall). According to various embodiments, one or more strategies may be employed to control, or at least mitigate, the effect of potentially bad estimates. Both strategies start by identifying a set of feasible lights and comparing the estimate with this set. In some embodiments, this set may comprise an extension to the plot of common lights. For example, this set might include Planckian (black body) lights and common fluorescent fixtures, mixes of two or more of these lights, and some colors close to these common lights to account for anticipated variation in chromaticity of light, sensor response, and various other factors. Generally, the set of feasible lights will have a chromaticity similar to Planckian lights between 1800 and 8000K, which approximates natural light sources ranging from the flame of a candle to moderate shade.

The first strategy is directed to containment of identified undesirable behavior, and includes reducing the worst case behavior (output) from the estimate. According to this strategy, the gray point is constrained to have a color that corresponds to some feasible light. This may be implemented, for instance, by checking if the estimate lies in the set of feasible lights and if it does not, replacing it with the nearest point in the set. If the set of feasible lights lies within a fixed distance of the gray line, this can be done by limiting the displacement of the estimate perpendicular and parallel to the line to some maximum value. The degree of correction required can also be used to reduce confidence in the estimate.

A second strategy may be employed that is directed to filtering "bad" estimates so that the impact on the system state by the bad estimates are reduced or eliminated altogether. This strategy naturally requires identifying poor performing estimates as bad estimates, which can be accomplished based upon the distance between the estimate and the set of feasible lights or the number of samples used. An attempt to detect if the estimate is unlikely may be performed by evaluating the refined gray point estimate in a process of generating a gray point estimate as depicted in the flowchart 700 of FIG. 7. At step 701, the distance between the refined estimate and the gray line is determined. The distance from the estimate to the gray line is then compared at step 703 to the most unnatural light supported by the device or system. According to some embodiments, this light may be pre-stored in configuration files for the device or system, and may be derived as a result of calibration. The derived distance between the estimate to the gray line may be calculated and stored as a value called the gray line thickness. If the distance between the refined estimate and the gray line is determined at step 703 to be less than the gray line thickness, then the estimate may be verified as a good estimate and the process continues to step 709. On the other hand, if the estimate lies outside the gray line thickness, then the current estimate is combined and averaged at step 705 with the last known good (verified) estimate generated in the system, and the resulting average is subsequently weighted at step 707, using an exponential falloff for the weighting, for example.

At step 709, the refined estimate as verified at step 703 is selected as the final estimate and stored (e.g., in a register or local memory device). Alternatively, if the refined estimate cannot be verified at step 703 (e.g., as lying beyond the gray line thickness), then the weighted average of the refined estimate and the last known good estimate derived in step 707 is selected as the final estimate and stored. Once stored, the estimate may be applied to the image data at step 711 to perform automatic white balancing. Application of the estimate to the image data may, according to some embodiments, be preceded by a conversion of the image data to RGB values, or data values corresponding to other color spaces, as necessary, or where appropriate. According to such embodiments, the evaluation process described in flowchart 700 of FIG. 7 can produce a hard cut-off threshold where estimates are either accepted, or rejected. Estimates that are rejected can simply be replaced with the last acceptable value.

Figure 7:
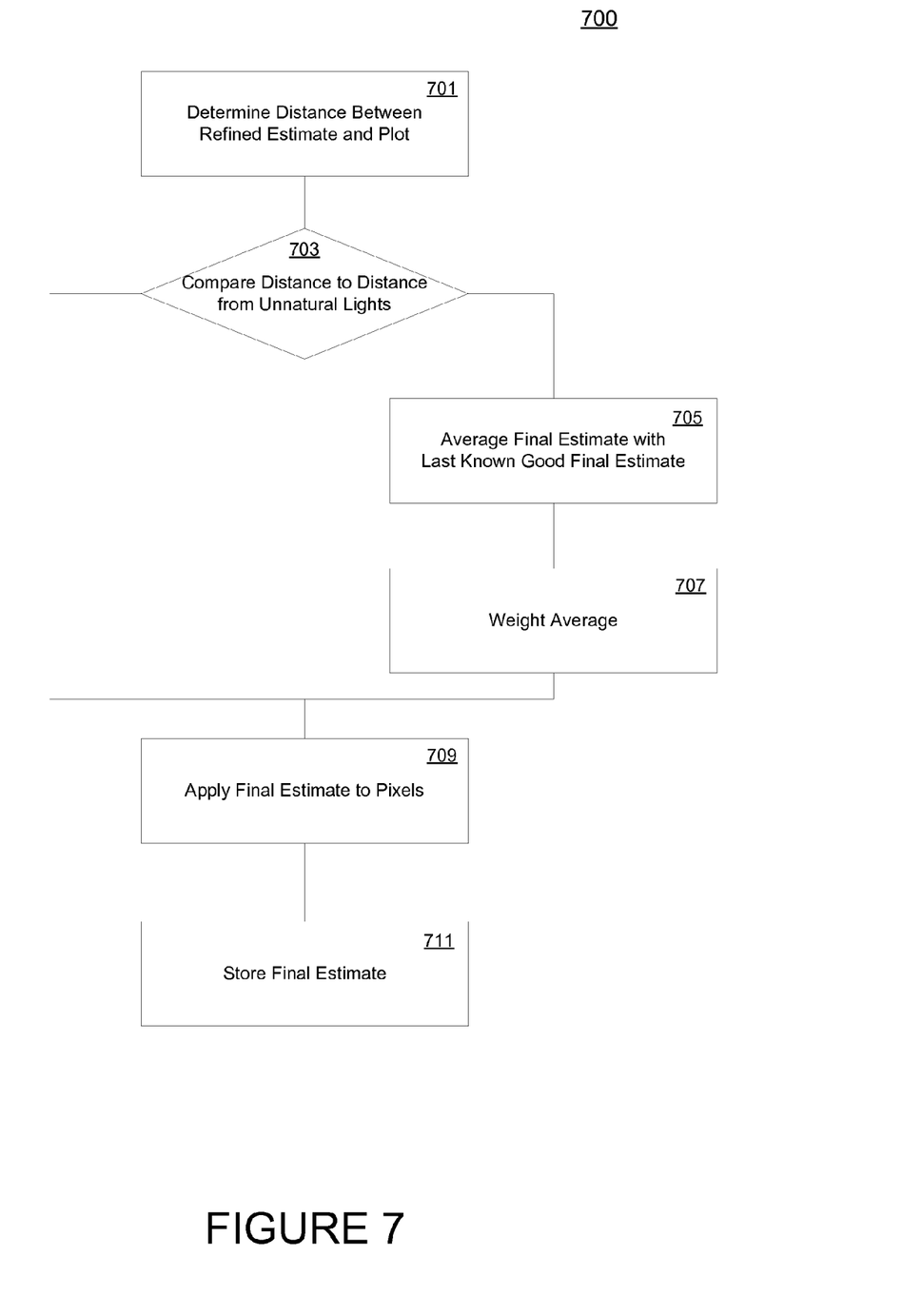
FIG. 7 depicts a flowchart of an computer implemented process for evaluating a refined gray point estimate in a process of generating a gray point estimate, in accordance with various embodiments of the present invention.

Additionally, rather than merely accepting or rejecting the refined gray point at step 709, the estimate can be further supplemented with a calculated confidence value (e.g., as a percentage, within a range from 0 to 1, etc.) which can then be used to smoothly vary the contribution of the estimate (e.g., as an applied white balance gain) to the actual system state. One embodiment of confidence estimation includes using a linear function based on the number samples used, clipped to the range 0-1, and applying an exponential decay as a function of the distance from the set of feasible lights. The linear function might, for example, produce 0 if less than 10% of the image is used and 1 if more than 30% is used. If the estimate lay in the set of feasible lights and 20% of the image were used, confidence would be 0.5. In a system that requires continuous auto-white balance, such as continuous capture systems with an electronic viewfinder or used for video recording, this confidence value can then be incorporated into the camera's damping system, by incorporating any derived confidence value into damping logic to control the contribution of the estimate to the current system state, for example. In the example of a proportional control loop, the confidence could be multiplied by the proportional constant (p) to further reduce the speed of adaptation. In this case, as the confidence goes from 1 to 0, the speed goes from p to 0. When confidence is 0, the "last known good" estimate is naturally used, which avoids severe failures. Intermediate degrees of failure will generate confidences greater than 0 and thus be smoothly incorporated, thereby eliminating a major source of discontinuity in display.

According to an embodiment, by combining the strategies of filtering and containment. an estimate that lies just outside the set of feasible lights would be constrained to the nearest point in the set of feasible lights, but would still be able to contribute strongly to the final system state, whereas an estimate far enough away would be ignored. Repeated observations of points somewhat outside the set of feasible lights would result in a gradual change in system state towards a point inside that set.

The confidence component of the estimate can also be used to combine this white balance method with other methods in a voting scheme. For example, each of several algorithms might have a particular weight associated with its estimate based upon a general characterization of reliability. That weight can be reduced as a function of the estimator confidence to avoid harming the aggregate estimate when the individual estimator has evidence that it is likely to be wrong. Such a method offers the possibility of combining complementary algorithms. This approach can extend to an arbitrary number and selection of supplementary methods for auto-whitebalance. Confidence can also be used to combine estimates in other ways. For example, an alternate embodiment might use the confidence and estimate from each white balance algorithm as inputs to a neural net, which would in turn generate weights to combine these estimates based on training with a large set of offline images. This approach offers the advantage that it can correlate confidence across methods to infer a better combination.

Color Preference, CCT Bias, and Isothermic Bias

In still further embodiments, additional contributions may be added to the final estimate prior to application to the image data. These contributions may, for example, be introduced due to user/consumer preferences in color, hardware limitations, etc, and may represent an application of biasing the correlated color temperature (CCT) of the achieved estimate, or isothermic (i.e. green/magenta) bias of the estimate. According to an embodiment, these additional contributions may be implemented in hardware. For example, a lookup table may be specified in the configuration phase of the hardware device (e.g., image capture device or image processing system). Each entry in the table describes how the refined gray point should be moved parallel and perpendicular to the gray line to apply a bias to the correlated color temperature. In still further embodiments, each entry contains a u coordinate on the gray line for the original estimate, the u coordinate for the adjusted point on the gray line, and optional values for the isothermic bias (corresponding to a displacement perpendicular to the gray line/Planckian locus). The gray line thickness (e.g., as used in flowchart 600) may also be increased or decreased to tradeoff performance under natural lighting against the range of artificial light sources that are considered feasible lights.

Accordingly, embodiments of the present invention as described herein provide a robust alternative to traditional gray world approach to white balancing. By utilizing kernel density estimation techniques with dynamically variable bandwidth to determine the probability density of samples to create an initial estimate, then verifying the initial gray point estimate to account for outliers, a final gray point estimate can be achieved that provides greater stability, and greatly improved accuracy over traditional techniques and solutions.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for calculating a white balance for an image capture device, the method comprising:
   receiving a set of image data comprising a plurality of pixels;
   calculating a position in a color space for each of the plurality of pixels, the color space comprising a plot of common lights;
   determining a plurality of distances between the positions of the pixels in the color space and the plot of common lights;
   sorting the plurality of pixels into a plurality of sample populations based on the distances;
   selecting a first sample population from the plurality of sample populations by calculating an estimate of a probability density as a function of distance from the plot of common lights for the plurality of sample populations;
   averaging the distances in the first sample population to determine an initial gray point estimate; and
   refining the initial gray point estimate into a final gray point estimate.

2. The method according to claim 1, further comprising converting the final gray point estimate into a set of white balance gains.

3. The method according to claim 2, further comprising storing the set of white balance gains to a memory.

4. The method according to claim 2, further comprising applying the set of white balance gains to the image data.

5. The method according to claim 4, wherein the set of image data comprises a down-sampled image.

6. The method according to claim 5, wherein the image capture device comprises an electronic viewfinder.

7. The method according to claim 6, wherein the applying the set of white balance gains to the image data comprises:
   rendering the image by applying the set of white balance gains to the set of image data; and
   displaying the image in the electronic viewfinder.

8. The method according to claim 7, wherein the rendering the image and the displaying the image in the electronic viewfinder are performed live.

9. The method according to claim 5, wherein the down-sampled image comprises a set of values in a sensor color space.

10. The method according to claim 1, further comprising converting the final gray point estimate into a correlated color temperature (CCT).

11. The method according to claim 10, further comprising applying the CCT to control multi-lens shading in the image capture device.

12. The method according to claim 1, wherein the color space comprises a harmonic mean color space.

13. The method according to claim 1, wherein the common lights in the plot of common lights comprise Planckian lights.

14. The method according to claim 1, wherein the plot of common lights comprises a Planckian locus.

15. The method according to claim 13, wherein the common lights in the plot of common lights comprise a plurality of fluorescent lights.

16. The method according to claim 1, wherein the calculating an estimate of the probability density as a function of distance from the plot of common lights for the plurality of sample populations comprises:
   applying a probability density function to the plurality of pixels comprised in the plurality of sample populations;
   plotting the probability density function for the plurality of sample populations;
   identifying a first peak in a plot of the probability density; and
   determining a first sample population from the plurality of sample populations based on the identified first peak in the plot of probability density.

17. The method according to claim 16, wherein the calculating a probability density comprises applying a kernel density estimator.

18. The method according to claim 17, wherein the applying a kernel density estimator comprises estimating a bandwidth for the kernel density estimator.

19. The method according to claim 18, wherein the bandwidth is dynamically variable.

20. The method according to claim 18, wherein the bandwidth is fixed.

21. The method according to claim 17, wherein the applying the kernel density estimator comprises:
sorting the plurality of sample populations using a radix sort; and
applying a kernel with a finite extent using a rolling window.

22. The method according to claim 16, wherein the refining the initial gray point comprises:
deriving a refined gray point estimate;
evaluating whether the refined gray point estimate is a reasonable final gray point estimate; and
selecting the refined gray point estimate as the final gray point estimate if the refined gray point estimate is a reasonable final gray point estimate.

23. The method according to claim 22, wherein the deriving the refined gray point estimate comprises:
sorting the first sample population based on the distance between the samples to the initial gray point;
applying a kernel density estimator to the first sample population to calculate a distribution of the samples in the first sample population;
identifying a plurality of sub-populations in the first sample population;
calculating an average for each of the plurality of sub-populations;
for each sub-population of the plurality of sub-populations, weighting the average of a sub-population based on the distance of the sub-population from the initial gray point and a number of samples in the sub-population; and
combining the weighted averages of the plurality of sub-populations into the refined gray point estimate.

24. The method according to claim 23, wherein the evaluating whether the refined gray point estimate is a reasonable final gray point estimate comprises determining a first distance comprising a distance between the refined gray point estimate and a set of feasible lights.

25. The method according to claim 24, wherein the set of feasible lights comprises a plurality of Planckian lights, a plurality of fluorescent lights, and a plurality of mixtures of lighting.

26. The method according to claim 24, further comprising:
comparing the first distance to a pre-determined threshold distance; and
replacing the refined gray point estimate with a final gray estimate based on a last known gray point estimate when the first distance is greater than the pre-determined threshold distance.

27. The method according to claim 26, wherein the replacing the refined gray point estimate with a final estimate based on a last known gray point estimate comprises:
calculating an average of the refined gray point estimate and a last known gray point estimate based on a exponential falloff;
calculating the final gray point estimate by weighting the average of the refined gray point estimate and the last known gray point estimate.

28. The method according to claim 24, further comprising:
comparing the number of samples in the first sample population to a pre-determined threshold population; and
replacing the refined gray point estimate with a last known gray point estimate when the number of samples in the first sample population is less than the pre-determined threshold population.

29. The method according to claim 24, further comprising:
calculating a confidence value for the refined gray point estimate based on the first distance; and
generating a final gray point estimate by applying the confidence value to the refined gray point estimate.

30. The method according to claim 29, wherein the calculating a confidence value for the refined gray point estimate based on the first distance comprises calculating a product of a linear function based on the number of samples in the first sample population, and an exponential decay as a function of distance of the estimate from the set of feasible lights.

31. The method according to claim 30, wherein the confidence value is incorporated into damping of a white balance control loop in a continuous capture system.

32. The method according to claim 30, wherein the per-frame confidence value and optionally a weight indicating general reliability are used to combine the refined gray estimate with a plurality of estimates from other methods for white balance.

33. The method according to claim 22, further comprising applying a correlated color temperature bias to the final gray point estimate.

34. The method according to claim 22, further comprising applying an isothermic bias to the final gray point estimate.

35. The method according to claim 22, further comprising applying a color preference bias to the final gray point estimate, the color preference bias comprising an offset based on a pre-specified user preference.

36. A non transitory computer readable medium containing program instructions embodied therein for causing an image capture device to calculate a gray point estimate for a captured image, the program instructions comprising:
instructions to receive a set of image data comprising a plurality of pixels;
instructions load a set of characterization data corresponding to a color space;
instructions to calculate a plot of common lights in the color space and a position in the color space for each of the plurality of pixels;
instructions to determine a plurality of distances between the positions of the pixels in the color space and the plot of feasible lights;
instructions to sort the plurality of pixels into a plurality of sample populations based on the distances;
instructions to select a first sample population from the plurality of sample populations by calculating an estimate of a probability density as a function of distance from the plot of common lights for the plurality of sample populations;
instructions to average the first sample population of the plurality of sample populations to determine an initial gray point estimate; and
instructions to refine the initial gray point to determine a refined gray point estimate.

37. A system for calculating a white balance estimate in an image capture device, said system comprising:
an image capture device comprising a lens, an image sensor and an image signal processor, the image capture device being configured to generate an image comprising a set of image data;
a memory, communicatively coupled to the image capture device, and configured to store the set of image data and a plurality of programmed instructions; and
a processor, communicatively coupled to the memory, and configured to execute the plurality of programmed instructions and to calculate a white balance estimate from the set of image data by refining an initial gray point estimate generated from averaging a selection of a plurality of sample pixels comprised in the set of image data and stored in the memory, the selection of the plurality of sample pixels comprising the pixels with corresponding positions in a color space closest to a pre-plotted line based on an application of a probability density function, wherein the initial gray point estimate is refined by applying a kernel density estimator to selection of the plurality of sample pixels to identify a plurality of sub-populations and by taking a weighted average of the plurality of sub-populations, further wherein the white balance estimate is applied to the set of image data.

\* \* \* \* \*